United States Patent [19]
Koenig et al.

[11] 3,884,930
[45] May 20, 1975

[54] MESOIONIC 2,3-SUBSTITUTED 5-ACYLIMINO-1,3,4-THIADIAZOLES

[75] Inventors: Horst Koenig, Ludwigshafen; Peter Thieme, Ruchheim; August Amann, Ludwigshafen, all of Germany

[73] Assignee: Badische Anilin- & Soda-Fabrik Aktiengesellschaft, Ludwigshafen, Rhine, Germany

[22] Filed: Sept. 11, 1972

[21] Appl. No.: 288,124

[30] Foreign Application Priority Data
Sept. 21, 1971 Germany.............................. 2147025

[52] U.S. Cl........................... 260/306.8 D; 424/270
[51] Int. Cl............................................. C07d 91/62
[58] Field of Search............................. 260/306.8 D

[56] References Cited
OTHER PUBLICATIONS
Moriarty et al., Chem. Abstracts, 68:105,176, (1968).
Stewart et al., Chem. Abstracts, 63:6998–6999, (1965).

*Primary Examiner*—Richard J. Gallagher
*Attorney, Agent, or Firm*—Johnston, Keil, Thompson & Shurtleff

[57] ABSTRACT

New mesoionic 1,3,4-thiadiazolimino-(5) derivatives and their salts which have an aromatic substituent in the 2-position and an acyl radical as substituent on an external nitrogen. The compounds have a central nervous system depressant activity.

3 Claims, No Drawings

MESOIONIC 2,3-SUBSTITUTED 5-ACYLIMINO-1,3,4-THIADIAZOLES

The invention relates to new mesoionic 1,3,4-thiadiazolimino-(5) derivatives which bear an acyl radical as a substituent on an external nitrogen and to their production.

It is known that N-1-substituted thiohydrazides can be cyclized with phosgene, thiophosgene or carbon disulfide to form 1,3,4-thiadiazolones-5 or -thiones-5 (R. Grashey et al., THL 1968, 5877 and 5881, Potts et al., Chem. Commun., 1968, 672):

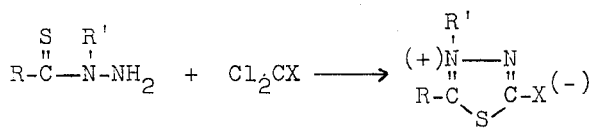

where X is oxygen or sulfur and R and R' are organic radicals.

It is known from a review of Chemiedozententagung Cologne 1970 (R. Grashey et al.) that mesoionic 1,3,4-thiadiazolimines-5 or 1,2,4-triazolethiones-3 can be obtained by reaction of thiohydrazides with isothiocyanates. The triazolethiones are also formed when an acylated thiosemicarbazide (accessible from N-1-substituted acid hydrazides and isothiocyanates) is cyclized with alkali (Potts et al., J. Org. Chem. 32, 2245, 1967):

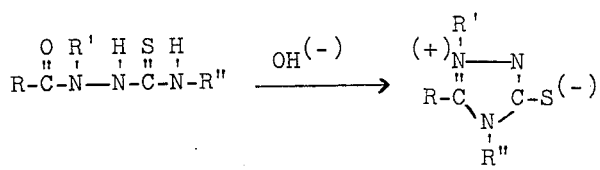

in which R, R' and R'' are organic radicals.

We have now found that chemically homogeneous mesoionic 1,3,4-thiadiazolimino-(5) derivatives of the formula:

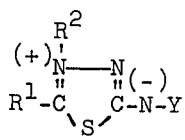

are obtained by reacting an N-1-substituted hydrazide or thiohydrazide with an acyl isothiocyanate:

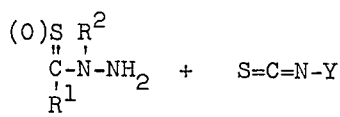

In these formulae $R^1$ is a phenyl radical which may bear one to three substituents, $R^2$ is alkyl of one to five carbon atoms which may bear as a substituent phenyl which in turn may bear substituents, Y is acyl derived from a fatty acid of two to eleven carbon atoms, a cycloaliphatic carboxylic acid of five to seven carbon atoms, phenylalkylcarboxylic acid, phenoxyalkylcarboxylic acid, phenylcarboxylic acid, carbonic acid monoester or N-dialkyl-substituted carbamate. The radical Y may accordingly be represented by the formula $-COR^3$ in which $R^3$ is linear or branched alkyl of one to ten carbon atoms, $C_5$ to $C_7$ cycloalkyl, phenylalkyl, phenoxyalkyl, monocyclic aryl, alkoxy or dialkylamino. The substituents in the phenyl radical $R^1$ are preferably lower alkyl ($C_1$ to $C_4$), halogen, hydroxy, nitro, alkoxy, amino, alkylamino, carboxyl or carbalkoxy.

Preferred radicals $R^1$ and $R^2$ are phenyl and methyl. Aliphatic acyl of two to five carbon atoms, benzoyl and phenyl-substituted aliphatic radicals of two or three carbon atoms are preferred for Y.

Preferred substituents in the phenyl radicals are methoxy, ethoxy, carbethoxy, chloro, nitro, hydroxyl and acylated hydroxyl.

In the case of multiple substitution of the phenyl radical, chloro and methoxy are preferred.

The new compound may be prepared by allowing the thiohydrazide and the acyl isothiocyanate to act on one another, advantageously by bringing the two components together and allowing them to act on one another at room temperature or elevated temperature. Hydrogen sulfide is formed and this may be combined by passing it into caustic alkali solution. Even when one of the components is liquid it is advisable to carry out the reaction thereof in the presence of an organic solvent. For this purpose a solution of one component may be placed in a vessel and the other component may be added as such or also in the form of a solution. The sequence is immaterial. The molar ratio of the two components is preferably 1:1 but an excess of one or other component is not injurious. The reaction may be accelerated by stirring, shaking and/or heating. The solvent used may be one of those conventionally used for chemical syntheses, for example an alcohol such as methyl or ethyl alcohol, acetone, benzene, ethyl acetate, acetonitrile, dimethylformamide, dimethylsulfoxide, or an ether such as tetrahydrofuran or dioxane. The solvent is preferably used in anhydrous condition.

In the case of hydrazides, the reaction proceeds analogously, water being eliminated.

The 1,3,4-thiadiazolimino derivatives are usually precipitated during the reaction; if not, they are obtained by precipitation or evaporation. Examples of solvents to be used for purification by recrystallization are ethyl alcohol, acetone, dimethylformamide or a mixture of dimethylformamide and ethyl alcohol.

Preferred compounds of this invention are those in which $R^1$ is phenyl or chlorophenyl, $R^2$ is methyl or ethyl and $R^3$ is acetyl, phenacetyl, phenylpropionyl or benzoyl.

The new compounds have central nervous system depressant action. They may also serve as intermediates for pharmaceutical products and plant protection agents. For example the anticonvulsive effect of the compound of Example 5 in the case of pentetrazole-induced convulsions in mice, for example in a dosage of about 100 mg/kg per os, is remarkable.

The 1,3,4-thiadiazolimino-(5) derivatives may be converted into salts with acids, for example hydrohalic acids, or alkyl halides, for example methyl iodide. Protonization and alkylation take place at the imino nitrogen:

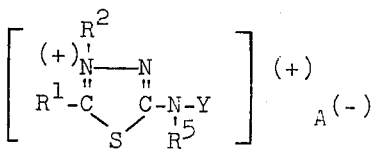

$R^5$ is hydrogen or lower alkyl and A is an anion, particularly of a strong inorganic acid, for example halide, sulfate, phosphate or perchlorate.

The structure of the mesoionic 1,3,4-thiadiazolimino-(5) derivatives follows from a comparison of their infrared spectra with those of the hydrochlorides. In the free 1,3,4-thiadiazolimino-(5) acyl derivative the carbonylamide band is shifted toward longer wavelengths (about 1,550 cm$^{-1}$) which may be attributable to a high single bond content of the amidocarbonyl due to the stabilizing negative charge on the acylimino radical. A normal amide band at about 1,650 cm$^{-1}$ is found in the hydrochloride and methoiodide.

The thiohydrazides required as starting components for the production of the new compounds may be prepared by conventional methods, for example from the activated esters of dithiocarboxylic acids and monosubstituted hydrazines (K. A. Jansen et al., Acta Chem. Scand., 15, 1109, (1961)). The acyl isothiocyanates required as starting components may be obtained by conventional methods by heating an acyl halide and an alkali metal thiocyanate for a short time in an anhydrous solvent such as acetone or acetonitrile. After the deposited alkali metal halide has been separated from the solution the latter may be used immediately for the production of the new compounds according to the process of this invention if it is not desired to isolate the acyl isothiocyanate previously. The hydrazides may be obtained by conventional methods.

The following Examples illustrate the invention.

EXAMPLE 1

2-phenyl-3-methyl-5-carbethoxyimino-1,3,4-thiadiazole:

6.6 g (0.05 mole) of carboethoxy isothiocyanate is dripped into 8.3 g (0.05 mole) of thiobenzo-1-methylhydrazide in absolute ethanol and then the whole is boiled under reflux for 8 hours. 7.4 g (56 percent of theory) is obtained. Melting point 112° to 113°C.

EXAMPLE 2

1-(2'-phenyl-3'-methyl-1',3',4'-thiadiazolyl-5')-3,3-dimethylurea:

5.4 g (0.05 mole) of N-dimethylcarbamoyl chloride and 4.9 g (0.05 mole) of potassium thiocyanate in 50 ml of absolute acetonitrile are boiled under reflux for 1 hour. The potassium chloride is filtered off and 8.3 g (0.05 mole) of thiobenzo-1-methylhydrazide is added to the solution. The mixture is heated under reflux for 12 hours. It is then evaporated and the residue is crystallized from acetone. 3.0 g (23 percent of theory) is obtained. Melting point: 178° to 181°C.

EXAMPLE 3

2-phenyl-3-methyl-1,3,4-thiadiazole-(2',2'-dimethylpropionyl)-imine-5:

3.6 g (0.03 mole) of pivaloyl chloride and 2.9 g (0.03 mole) of potassium thiocyanate in 50 ml of absolute acetonitrile are heated at 80°C for 10 minutes and then cooled. The potassium chloride is separated and 5.0 g of thiobenzo-1-methylhydrazide is added. The mixture is heated for an hour under reflux. The product crystallizes upon cooling. 5.7 g (69 percent of theory) of colorless needles are obtained. Melting point: 233° to 235°C after recrystallization from ethanol.

EXAMPLES 4 to 16

The following are obtained analogously to Example 3:

4. 2-phenyl-3-methyl-1,3,4-thiadiazolacetylimine-5; melting point 155° to 158°C. 71 percent yield.
5. 2-phenyl-3-methyl-1,3,4-thiadiazolephenacetylimine-5; melting point 183° to 184°C. 77 percent yield.
6. 2-phenyl-3-methyl-1,3,4-thiadiazolebenzoylimine-5; melting point 261° to 263°C. 94 percent yield.
7. 2-phenyl-3-methyl-1,3,4-thiadiazole-o-hydroxybenzoylimine-5; melting point 218° to 219°C. 71 percent yield.
8. 2-phenyl-3-methyl-1,3,4-thiadiazole-p-hydroxybenzoylimine-5; melting point 245°C with decomposition. 27 percent yield.
9. 2-phenyl-3-methyl-1,3,4-thiadiazole-p-acetoxybenzoylimine-5; melting point 196° to 198°C. 82 percent yield.
10. 2-phenyl-3-methyl-1,3,4-thiadiazole-p-chlorobenzoylimine-5; melting point 232° to 234°C. 89 percent yield.
11. 2-phenyl-3-methyl-1,3,4-thiadiazole-p-nitrobenzoylimine-5; melting point 269° to 271°C. 77 percent yield.
12. 2-phenyl-3-methyl-1,3,4-thiadiazole-(2',4'-dichlorobenzoyl) imine-5; melting point 199° to 202°C. 49 percent yield.
13. 2-phenyl-3-methyl-1,3,4-thiadiazole-(3',4',5'-trimethoxybenzoyl) imine-5; melting point 205° to 207°C. 53 percent yield.
14. 2-phenyl-3-methyl-1,3,4-thiadiazolephenoxyacetylimine-5; melting point 130° to 132°C. 68 percent yield.
15. 2-(p-chlorophenyl)-3-methyl-1,3,4-thiadiazole-(2',2'-dimethylpropionyl)-imine-5; melting point 229° to 230°C. 44 percent yield.
16. 2-(p-chlorophenyl)-3-methyl-1,3,4,thiadiazole-(3',4',5'-trimethoxybenzoyl)-imine-5; melting point 212° to 216°C 92 percent yield.

EXAMPLES 17 to 23

The following are obtained analogously to Example 1:

17. 2-(p-ethoxyphenyl)-3-methyl-5-carbethoxyimino-1,3,4-thiadiazole; melting point 138° to 140°C. 43 percent yield.
18. 2-(p-chlorophenyl)-3-methyl-5-carbethoxyimino-1,3,4-thiadiazole; melting point 234° to 236°C. 38 percent yield.
19. 2-phenyl-3-methyl-1,3,4-thiadiazole-(2'-phenylpropionyl)-imine-5; melting point 201° to 203°C. 78 percent yield.
20. 2-(p-chlorophenyl)-3-methyl-1,3,4-thiadiazolephenacetylimine-5; melting point 161° to 163°C. 69 percent yield.
21. 2-(p-chlorophenyl)-3-methyl-1,3,4-thiadiazole-(2'-phenylpropionyl) -imine-5; melting point 166° to 167°C. 81 percent yield.
22. 2-phenyl-3-methyl-1,3,4-thiadiazole-p-methylamino-carbonyloxy-benzoylimine-5; melting point 211° to 214°C. 64 percent yield.

23. 2-(p-chlorophenyl-3-methyl-1,3,4-thiadiazole-p-methyl-aminocarbonyloxybenzoylimine-5; melting point 219° to 220°C. 76 percent yield.

Since the compounds are mainly intended for peroral application, appropriate formulations such as tablets are the preferred form for administration.

We claim:

1. A mesoionic 1,3,4-thiadiazolimino-5 derivative of the formula:

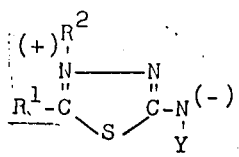

in which $R^1$ is phenyl which may bear chlorine, methoxy or ethoxy as a substituent, $R^2$ is alkyl of one to five carbon atoms which may bear phenyl as a substituent; Y is acyl derived from a fatty acid of two to five carbon atoms, phenacetyl, phenylpropionyl, carbethoxy, dimethylaminocarbonyl, phenoxyacetyl, benzoyl or benzoyl substituted by 1-3 methoxy groups, ethoxy, carbethoxy, 1 or 2 chlorine groups, nitro, hydroxyl, acetoxy or methylaminocarbonyloxy, or a salt of a strong inorganic acid or a methoiodide of said derivative.

2. A compound as set forth in claim 1, wherein $R^2$ is methyl or ethyl.

3. A compound as set forth in claim 1, wherein Y is benzoyl in which the phenyl bears two chlorine or three methoxy groups.

* * * * *